(12) United States Patent
Buonpane et al.

(10) Patent No.: US 8,239,663 B2
(45) Date of Patent: Aug. 7, 2012

(54) SYSTEM AND METHOD FOR MAINTAINING THE SECURITY OF MEMORY CONTENTS AND COMPUTER ARCHITECTURE EMPLOYING THE SAME

(75) Inventors: Michael S. Buonpane, Easton, PA (US); Richard P. Martin, Macungie, PA (US); Richard Muscavage, Gilbertsville, PA (US); Zhongke Wang, Bridgewater, NJ (US); Eric P. Wilcox, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 520 days.

(21) Appl. No.: 12/475,473

(22) Filed: May 30, 2009

(65) Prior Publication Data
US 2010/0306519 A1 Dec. 2, 2010

(51) Int. Cl.
*G06F 21/00* (2006.01)
(52) U.S. Cl. ............ 713/1; 713/182; 713/183; 713/184; 713/185; 713/189; 713/190
(58) Field of Classification Search ...... 713/1, 182–184, 713/189–190
See application file for complete search history.

(56) References Cited

U.S. PATENT DOCUMENTS

| 5,949,882 | A | * | 9/1999 | Angelo | 713/185 |
| 8,006,000 | B2 | * | 8/2011 | Saito et al. | 710/23 |
| 2006/0090084 | A1 | * | 4/2006 | Buer | 713/189 |
| 2009/0216921 | A1 | * | 8/2009 | Saito et al. | 710/39 |

* cited by examiner

*Primary Examiner* — M Elamin

(57) ABSTRACT

A secure memory system and a method of maintaining the security of memory contents. One embodiment of the system includes: (1) a security control module configured to transmit a system memory secure mode signal and processor secure mode signal to place the system in a secure mode, (2) a secure memory bridge coupled to the security control and system memory and configured to encrypt and decrypt data associated with the system memory based on a state of the system memory secure mode signal and (3) a boot processor coupled to the security control module and the secure memory bridge and configured to transmit requests to the secure memory bridge in the secure mode and an unsecure mode.

20 Claims, 3 Drawing Sheets

SYSTEM AND METHOD FOR MAINTAINING THE SECURITY OF MEMORY CONTENTS AND COMPUTER ARCHITECTURE EMPLOYING THE SAME

TECHNICAL FIELD

This application is directed, in general, to a secure computer systems and, more specifically, to a system and method for maintaining the security of memory contents and a computer system employing the same.

BACKGROUND

In a conventional computer system memory architecture, one or more processors and any peripheral bus masters on a bus interconnect can request and obtain access to system memory (also called "M2 memory"), i.e., read from or write to the memory. Peripheral masters include external device controllers such as Peripheral Component Interconnect (PCI), PCI Express (PCIe), Serial Rapid Input/Output (SRIO) and Gigabit Ethernet® (GbE) controllers, to name just a few.

A secure system is defined as a system in which only processors and peripherals that have security clearance can gain access to the contents (e.g., computer instructions or the data with which such instructions operate) stored in secure memory. In a secure system, all processors and peripherals that do not have security clearance are denied access to those secure locations. A problem in trying to design a secure system with system memory is that when the system has a reset applied to it, the contents of the system memory are not reset (cleared). This could allow an unsecure processor or bus master, including one temporarily plugged into an external device controller of the system, to gain unauthorized access to the contents of the system memory.

SUMMARY

One aspect provides a secure memory system. One embodiment of the system includes: (1) a security control module configured to transmit a system memory secure mode signal and processor secure mode signal to place the system in a secure mode, (2) a secure memory bridge coupled to the security control and system memory and configured to encrypt and decrypt data associated with the system memory based on a state of the system memory secure mode signal and (3) a boot processor coupled to the security control module and the secure memory bridge and configured to transmit requests to the secure memory bridge in the secure mode and an unsecure mode.

Another embodiment of the system includes: (1) a bus interconnect, (2) a boot processor coupled to, and configured to be a bus master for, the a bus interconnect, (3) a secure memory bridge coupled to, and configured to be a bus slave for, the bus interconnect and configured to encrypt and decrypt data associated with the system memory based on a state of a system memory secure mode signal, the boot processor further configured to transmit requests to the secure memory bridge in a secure mode and an unsecure mode, (4) system memory coupled to the secure memory bridge, (5) a secure read-only memory and an unsecure read-only memory coupled to, and configured to be bus slaves for, the bus interconnect, (6) a secure bus bridge coupled to, and configured to be a bus slave for, the bus interconnect, (7) a security control module coupled to the secure bus bridge and configured to transmit the system memory secure mode signal and processor secure mode signal to place the system in the secure mode and (8) an external device controller coupled to, and configured to be a bus master for, the bus interconnect.

Another aspect provides a method of maintaining the security of memory contents. One embodiment of the method includes: (1) configuring a computer system in which a system memory containing the contents is located in a secure mode, (2) transmitting a system memory secure mode signal to a secure memory bridge in the system, (3) transmitting a processor secure mode signal to a boot processor in the system, (4) transmitting encryption and decryption keys to the secure memory bridge, (5) placing an encrypter and a decrypter in the secure memory bridge in data paths therein and (6) causing the secure memory bridge to respond to write and read requests using the encryption and decryption keys.

BRIEF DESCRIPTION

Reference is now made to the following descriptions taken in conjunction with the accompanying drawings, in which.

DETAILED DESCRIPTION

As stated above, a computer system memory architecture can allow an unsecure processor or bus master to gain unauthorized access to the contents of its system memory when the system has a reset applied to it. Described herein are various embodiments of a system and method for securing the contents of system memory during and after a system reset. As used herein, "data" is defined as one or more binary digits, which may function as computer instructions (i.e., software or firmware) and the information (i.e., operands) on which such instructions operate.

Certain embodiments introduce systems and methods in which the contents of the system memory can be made secure even after a full system reset in which the system as a whole cannot be considered secure. In short, the systems and methods provide:

a secure mode in which data to be written to the system memory is encrypted before being written and data to be read from the system memory is decrypted after having been read, and an unsecure mode in which encryption and decryption do not occur.

In certain of these embodiments, the system memory is loaded through a secure boot routine in which the system memory is first placed in a secure mode and then loaded with data. Then, without leaving the secure mode, the secure boot routine is exited, at which time a normal system configuration may be assumed. Were the system memory to be read while the system memory was unsecure, the (encrypted) contents of the system memory would be read without decryption. The contents of the system memory remain secure.

Figure 1:
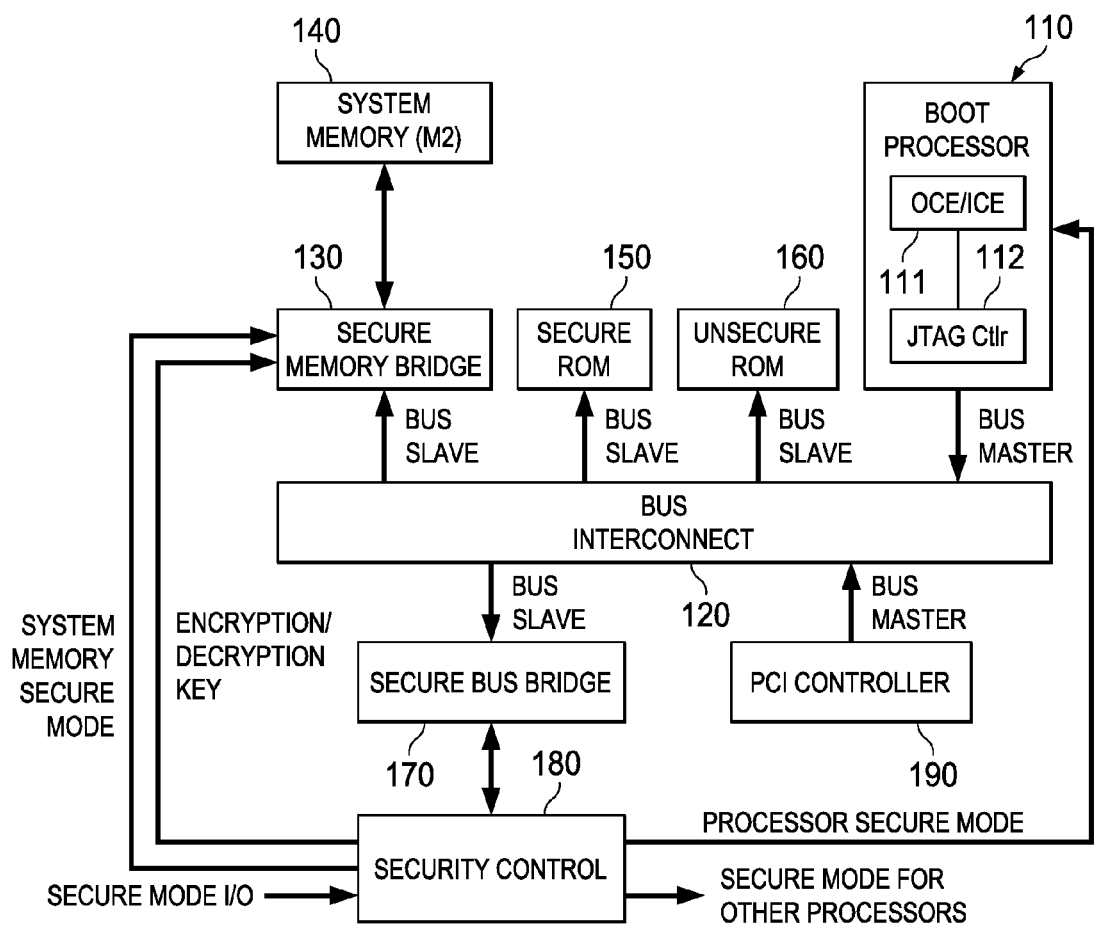
FIG. 1 is a high level block diagram of one embodiment of a secure computer system.

FIG. 1 is a high level block diagram of one embodiment of a secure computer system. The architecture includes a boot processor 110 coupled to, and configured to be a bus master for, a bus interconnect 120. A secure memory bridge 130 is also coupled to, and configured to be a bus slave for, the bus interconnect 120. The secure memory bridge 130 is in turn coupled to system memory (M2) 140 as shown. Various embodiments of the secure memory bridge 130 will be described more particularly in conjunction with FIG. 2. In general, the secure memory bridge 130 is configured to enhance the security of the system memory 140 with respect to communication with the bus interconnect 120. The system memory 140 may be any, or any combination of, conventional or later-developed read-write-capable memory of any kind, speed, configuration or capacity whatsoever, including dynamic random access memory (DRAM), static random-access memory (SRAM), erasable programmable read-only memory (EPROM), electrically erasable read-only memory (EEPROM, also called "flash memory") or magnetic, mageto-optical and optical storage media and/or drives.

A secure read-only memory (ROM) 150 and an unsecure ROM 160 are also coupled to, and configured to be bus slaves for, the bus interconnect 120. In the illustrated embodiment, the secure ROM 150 is available via the bus interconnect 120 only in the secure mode, and the unsecure ROM 160 is available via the bus interconnect 120 in both the secure and unsecure modes. In the illustrated embodiment, the secure ROM 150 is employed in a secure boot of the secure computer system.

A secure bus bridge 170 is coupled to, and configured to be a bus slave for, the bus interconnect 120. The secure bus bridge 170 is in turn coupled to security control module 180 as shown. As will be described more particularly in conjunction with FIG. 2, various embodiments of the secure bus bridge 170 have a structure and function analogous to that of the secure memory bridge 130. In general, the secure bus bridge 170 is configured to enhance the security of the security control module 180 with respect to communication with the bus interconnect 120.

A PCI controller 190 is coupled to, and configured to be a bus master for, the bus interconnect 120. The PCI controller 190 is one type of external device controller. Alternative embodiments include one or more other external device controllers, such as PCI, PCI Express PCIe, SRIO and GbE controllers. As described above, the PCI controller 190 provides an interface through which PCI-compliant devices may take control of and communicate via the bus interconnect 120. As noted above, these and other devices may attempt to compromise the security of the system memory 140 under certain circumstances.

Compared with a conventional computer system, the illustrated embodiment of the secure computer system of FIG. 1 provides the secure memory bridge 130, the secure ROM 150, the secure bus bridge 170 and the security control module 180. Given this architecture the boot processor 110, which in the illustrated embodiment defaults to a secure mode upon a system reset and uses instruction from the secure ROM 150, dictates through the security control module 180 which resources of the system (e.g., all or banks of the system memory 140 or other processors) are able to become secure. In the secure mode, only secure masters have access to the system memory 140. With the system memory 140 secure, unsecure (unauthorized) devices do not have permission to gain (decrypted) access to the system memory 140. In the illustrated embodiment, all devices that could be coupled to the PCI controller 190 and all other external interfaces are deemed unsecure.

The embodiment of FIG. 1 may be booted by the following process:

First, a "secure mode I/O" signal provided to the security control module 180 determines whether or not the system is to boot in the secure mode. If the system is not going to boot in secure mode, it acts as a conventional system and boots from the unsecure ROM 160. A reset signal is then applied.

Upon system reset, the system is in the unsecure mode, except for the boot processor 110, which is either in the secure mode or the unsecure mode depending upon the state of the secure mode I/O signal and the security control module 180, which is always in the secure mode. The boot processor 110 initializes the system via instructions in the secure ROM 150. The boot processor 110 then employs the security control module 180 and the secure memory bridge 130 to place the system memory 140 in a secure mode. The security control module 180 then provides an encryption key to the secure memory bridge 130, which the secure memory bridge 130 then uses to encrypt any data to be written to the system memory 140. In the illustrated embodiment, the encryption key is different every time the system is reset. In an alternative embodiment, the encryption key remains unchanged after a reset. The security control module 180 also provides a decryption key to the secure memory bridge 130, which the secure memory bridge 130 then uses to decrypt any data to be read from the system memory 140. The illustrated embodiment employs a symmetric cryptographic technique, meaning that the encryption and decryption keys are identical. An alternative embodiment employs an asymmetric cryptographic technique, resulting in the encryption and decryption keys being different. The security control module 180 also provides a "secure memory secure mode" signal to the secure memory bridge 130 that either enables or disables encryption/decryption, allowing the system memory 130 respectively to operate in the secure mode or the unsecure mode. Therefore, if the system memory 140 is in the unsecure mode, data is written and read directly from the system memory 140 without being encrypted or decrypted.

Figure 2:
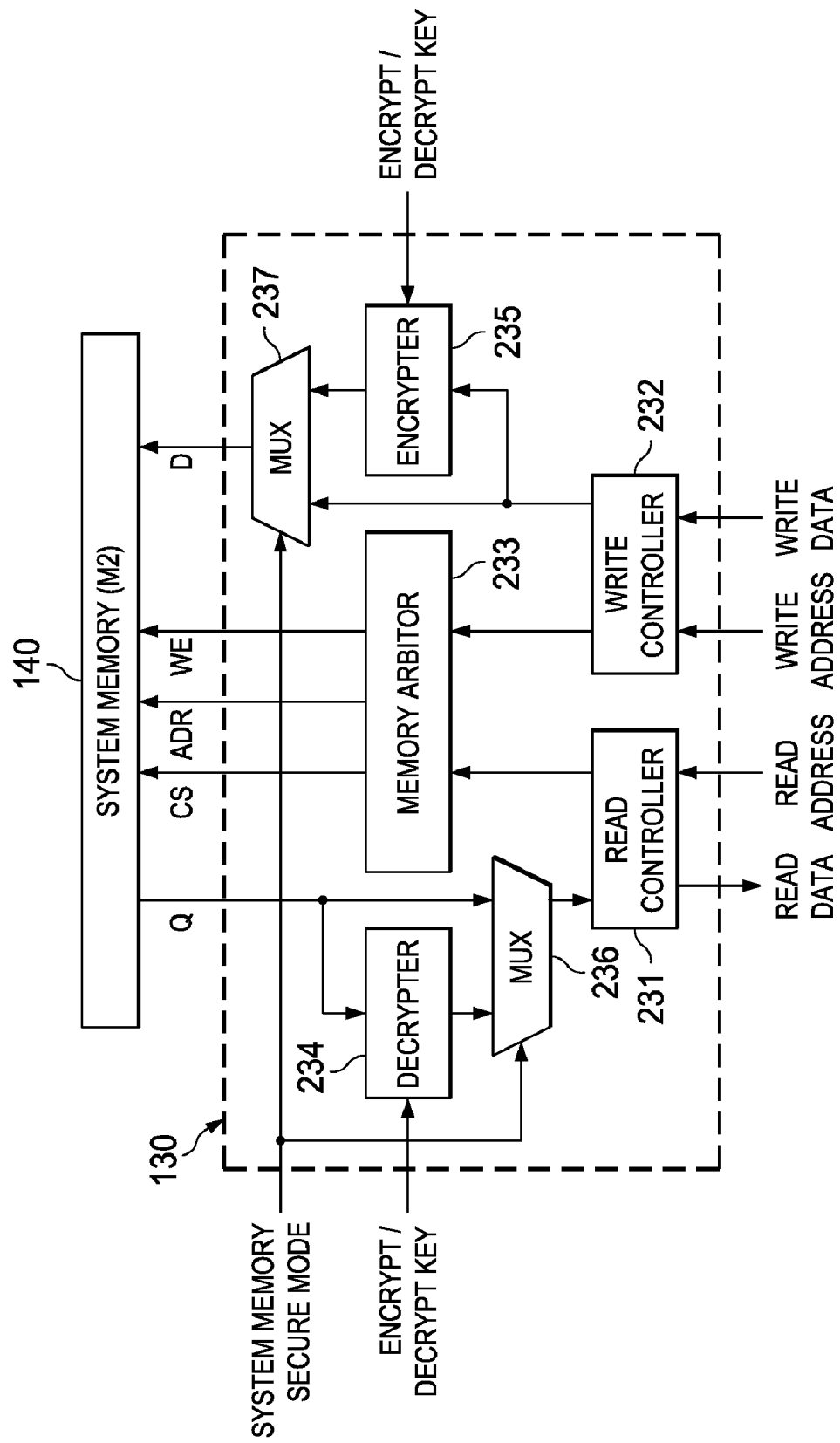
FIG. 2 is a block diagram of a portion of the architecture of FIG. 1 showing, in particular, one embodiment of a secure memory bridge that mediates communication between a bus interconnect and system memory.

Turning briefly to FIG. 2, illustrated is a block diagram of one embodiment of the secure memory bridge 130. FIG. 2 shows in greater detail signals that may be communicated between the secure memory bridge 130 and the system memory 140. "D" and "Q" are respective data input and data output signals for the system memory 140. "CS" and "ADR" are respective chip select and address lines to enable addressing of the data. "WE" is a write enable signal that determines whether the memory operation being performed is a read or a write.

The secure memory bridge 130 includes a read controller 231, a write controller 232, a memory arbiter 233, a decrypter 234, an encrypter 235 and read and write multiplexers (MUXes) 236, 237. The inputs of the MUX 236 are coupled to the Q output of the system memory 140 and the decrypter 234, and its output is coupled to the read controller 231. The inputs of the MUX 237 are coupled to the write controller 232 and the encrypter 235, and its output is coupled to the D input of the system memory 140.

In the illustrated embodiment, the read controller 231 is configured to receive a read request and address from the bus interconnect 120 of FIG. 1 and respond to the read request with data read from the system memory 140. The read controller 231 also remaps the address to adapt it to the structure of the system memory 140, although the read controller 231 does not perform address remapping in other embodiments. In the illustrated embodiment, the read controller 231 is conventional. However, it need not be.

In the illustrated embodiment, the write controller 232 is configured to receive a write request, data to be written and address from the bus interconnect 120 of FIG. 1 and respond to the write request by forwarding the data to be written and the address to the system memory 140. The write controller 232 also remaps the address to adapt it to the structure of the system memory 140, although the write controller 232 does not perform address remapping in other embodiments. In the illustrated embodiment, the write controller 232 is conventional. However, it need not be.

In the illustrated embodiment, the memory arbiter 233 is configured to receive read and write requests respectively from the read controller 231 and the write controller 232 and resolve any timing or data dependency conflicts those requests may have. In the illustrated embodiment, the memory arbiter 233 is conventional. However, it need not be.

As described above, the security control module 180 provides a system memory security mode signal to the secure memory bridge 130. FIG. 2 shows the memory security mode signal being applied to selector inputs of the MUXes 236, 237. In the embodiment of FIGS. 1 and 2, the system memory security mode signal assumes one of two states representing the unsecure mode and the secure mode. In the secure mode, the memory security mode signal causes the MUXes 236, 237 to select the inputs respectively coupled to the output of the decrypter 234 and the output of the encrypter 235. Thus in the secure mode, the decrypter 234 and the encrypter 235 are placed in the data paths of the secure memory bridge 130; data written to the system memory 140 is encrypted, and data read from the system memory 140 is decrypted. In the unsecure mode, the memory security mode signal causes the MUXes 236, 237 to select the inputs respectively coupled to the Q output of the system memory 140 and the output of the write controller 232. Thus in the unsecure mode, data written to the system memory 140 is not encrypted, and data read from the system memory 140 is decrypted; writing and reading of data is performed as in conventional, unsecure architectures.

Returning to FIG. 1, after all the data that needs to be stored in a secure manner is transferred into the system memory 140, the boot processor 110 retains the system memory 140 (or perhaps only certain banks thereof) in the secure mode, places and any desired bus masters (e.g., other processors, not shown) in the secure mode and then releases itself from being in secure mode. At this point, the boot processor 110 runs from the unsecure ROM 160, if it runs at all. In the illustrated embodiment, the boot processor 110 cannot thereafter return to the secure mode, unless a subsequent system reset happens. In an alternative embodiment, the boot processor 110 is allowed to return to the secure mode under controlled circumstances.

Certain embodiments of the system and method address security of the boot processor 110 itself. The boot processor 110 is illustrated as including an on-chip emulator/in-chip emulator (OCE/ICE) module 111, conventionally employed for the purpose of debugging software executing in the boot processor 110. The boot processor 110 also includes a Joint Test Experts Group (JTAG) controller 112 coupled to the OCE/ICE module 111 and the core (not separately shown) of the boot processor 110. The JTAG controller 112 provides an interface by which commands, input data and test results may be shifted into and out of the OCE/ICE module 111. During software debug, the OCE/ICE module 111 translates commands received from the JTAG controller 112 and implements the commands through the core of the boot processor 110. In this way, a designer can stop, step, run, read from the system memory 140, write to the system memory 140, setup breakpoints and inject instructions to the boot processor 110. Since, the boot processor 110 has secure access to the system memory 140 in the secure mode, and since the OCE/ICE module 111 can control the boot processor 110, a security breach can occur unless steps are taken also to secure the OCE/ICE module 111. According to these certain embodiments, while the boot processor 110 is in the secure mode, the OCE/ICE module 111 cannot gain access to the remainder of the boot processor 110 (and the system memory 140) unless the OCE/ICE module 111 has written a key that corresponds to a secret key stored in the security control module 180.

If a bus master that is not in the secure mode (e.g., the PCI controller 190) tries to read data from, or write data to, the system memory 140 while it is in the secure mode, the system memory 140 does not perform the command, but instead responds with a bus error.

With the addition of the security control module 180 and the secure memory bridge 130, only secure accesses to the system memory 140 are allowed when the secure memory bridge 130 is in the secure mode. Unsecure accesses to the system memory 140 result in a bus error; the access never occurs. As stated above, a system reset places the secure memory bridge 130 in the unsecure mode, but the contents of the system memory 140 remains encrypted.

Figure 3:
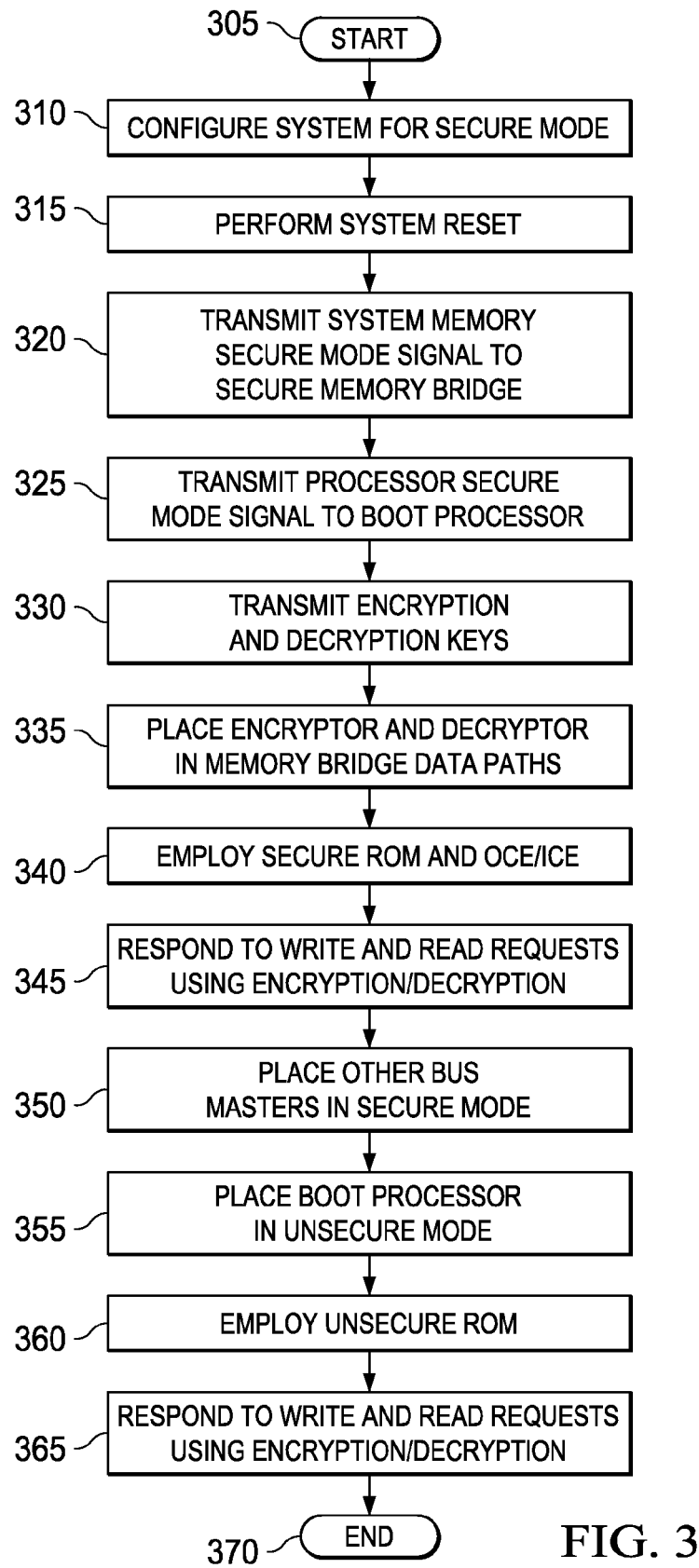
FIG. 3 is a flow diagram of one embodiment of a method of maintaining the security of memory contents.

FIG. 3 is a flow diagram of one embodiment of a method of maintaining the security of memory contents. The method begins in a start step 305. In a step 310, a computer system in which the memory is located is configured to operate in the secure mode. In one embodiment, a secure mode I/O pin is set to a particular binary value. In a step 315, a reset signal is applied to the system, causing it to reset. In a step 320, a system memory secure mode signal is transmitted to a secure memory bridge in the system. In a step 325, a processor secure mode signal is transmitted to a boot processor in the system. In a step 330, encryption and decryption keys are transmitted to the secure memory bridge. A key may also be transmitted to the boot processor for use in testing, if such is performed. In a step 335 and in response to the transmitted system memory secure mode signal, an encrypter and a decrypter in the secure memory bridge are placed in data paths therein. In a step 340, the boot processor employs a secure ROM to execute instructions stored therein. If testing of the system is desired, an OCE/ICE associated with the boot processor may also be employed. A key gives the OCE/ICE access to the secure system memory. In a step 345, the system memory responds to write and read requests using encryption and decryption as appropriate. In a step 350, the boot processor places other bus masters (e.g., other processors in the system) in the secure mode as a prelude to post-boot system operation.

In a step 355, it is desired to depart the secure mode and enter the unsecure mode. Accordingly, the processor secure mode signal changes state, causing the boot processor to enter the unsecure mode. However, in the illustrated embodiment, at least some of the system memory remains in the secure mode. In a step 360, the boot processor uses an unsecure ROM to execute instructions stored therein. In a step 365, the system memory responds to write and read requests directly (using encryption or decryption) as appropriate. The method ends in an end step 365.

Those skilled in the art to which this application relates will appreciate that other and further additions, deletions, substitutions and modifications may be made to the described embodiments.

What is claimed is:

1. A secure memory system, comprising:
a security control module configured to transmit a system memory secure mode signal and processor secure mode signal to place said system in a secure mode;
a secure memory bridge coupled to said security control and system memory and configured to encrypt and decrypt data associated with said system memory based on a state of said system memory secure mode signal; and
a boot processor coupled to said security control module and said secure memory bridge and configured to transmit requests to said secure memory bridge in said secure mode and an unsecure mode.

2. The system as recited in claim 1 wherein said security control module is further configured to transmit at least one key to said secure memory bridge.

3. The system as recited in claim 2 wherein said at least one key includes separate encryption and decryption keys.

4. The system as recited in claim 2 wherein said secure memory bridge includes:
   a decrypter having an output thereof coupled to an input of a first multiplexer; and
   an encrypter having an output thereof coupled to an input of a second multiplexer, said system memory secure mode signal provided to said first and second multiplexers and said at least one key provided to said encrypter and said decrypter.

5. The system as recited in claim 1 wherein said security control module is further configured to transmit a key to said boot processor.

6. The system as recited in claim 5 wherein said boot processor further includes an on-chip emulator/in-chip emulator and a Joint Test Action Group controller coupled thereto, said on-chip emulator/in-chip emulator configured to receive and employ said key for communication with said secure memory bridge.

7. The system as recited in claim 1 further comprising a secure read-only memory and an unsecure read-only memory configured for respective use in said secure and unsecure modes.

8. A method of maintaining the security of memory contents, comprising:
   configuring a computer system in which a system memory containing said contents is located in a secure mode;
   transmitting a system memory secure mode signal to a secure memory bridge in said system;
   transmitting a processor secure mode signal to a boot processor in said system;
   transmitting encryption and decryption keys to said secure memory bridge;
   placing an encrypter and a decrypter in said secure memory bridge in data paths therein; and
   causing said secure memory bridge to respond to write and read requests using said encryption and decryption keys.

9. The method as recited in claim 8 wherein said configuring comprises setting a secure mode I/O pin to a particular binary value.

10. The method as recited in claim 8 further comprising applying a reset signal to said system.

11. The method as recited in claim 8 further comprising transmitting a key to a boot processor in said system.

12. The method as recited in claim 11 further comprising causing said boot processor to employ a secure ROM to execute instructions stored therein.

13. The method as recited in claim 8 wherein said boot processor further comprises an on-chip emulator/in-chip emulator and said method further comprising employing said key for communication with said secure memory bridge.

14. The method as recited in claim 8 further comprising placing other bus masters in said secure mode as a prelude to post-boot system operation.

15. A secure memory system, comprising:
   a bus interconnect;
   a boot processor coupled to, and configured to be a bus master for, said a bus interconnect;
   a secure memory bridge coupled to, and configured to be a bus slave for, said bus interconnect and configured to encrypt and decrypt data associated with said system memory based on a state of a system memory secure mode signal, said boot processor further configured to transmit requests to said secure memory bridge in a secure mode and an unsecure mode;
   system memory coupled to said secure memory bridge;
   a secure read-only memory and an unsecure read-only memory coupled to, and configured to be bus slaves for, said bus interconnect;
   a secure bus bridge coupled to, and configured to be a bus slave for, said bus interconnect;
   a security control module coupled to said secure bus bridge and configured to transmit said system memory secure mode signal and processor secure mode signal to place said system in said secure mode; and
   an external device controller coupled to, and configured to be a bus master for, said bus interconnect.

16. The system as recited in claim 15 wherein said security control module is further configured to transmit at least one key to said secure memory bridge.

17. The system as recited in claim 16 wherein said at least one key includes separate encryption and decryption keys.

18. The system as recited in claim 16 wherein said secure memory bridge includes:
   a decrypter having an output thereof coupled to an input of a first multiplexer; and
   an encrypter having an output thereof coupled to an input of a second multiplexer, said system memory secure mode signal provided to said first and second multiplexers and said at least one key provided to said encrypter and said decrypter.

19. The system as recited in claim 15 wherein said security control module is further configured to transmit a key to said boot processor.

20. The system as recited in claim 19 wherein said boot processor further includes an on-chip emulator/in-chip emulator and a Joint Test Action Group controller coupled thereto, said on-chip emulator/in-chip emulator configured to receive and employ said key for communication with said secure memory bridge.

* * * * *